US00RE34147E

United States Patent [19]

Rezek

[11] E Patent Number: Re. 34,147

[45] Reissued Date of Patent: Dec. 22, 1992

[54] CEILING FAN ASSEMBLY

[75] Inventor: Ron Rezek, Culver City, Calif.

[73] Assignee: Beverly Hills Fan Company, Woodland Hills, Calif.

[21] Appl. No.: 603,048

[22] Filed: Oct. 25, 1990

Related U.S. Patent Documents

Reissue of:

[64] Patent No.: 4,884,947
Issued: Dec. 5, 1989
Appl. No.: 250,257
Filed: Sep. 27, 1988

[51] Int. Cl.[5] ..... F04D 29/64

[52] U.S. Cl. ..... 416/5; 416/170 R

[58] Field of Search ..... 416/5, 170 R

[56] References Cited

U.S. PATENT DOCUMENTS

| | | | |
|---|---|---|---|
| D. 82,179 | 9/1930 | Ringwald | 416/206 |
| 560,569 | 5/1896 | Brinser | 416/5 |
| 623,801 | 4/1899 | Melzer | 416/170 C |
| 636,871 | 11/1899 | Wait | 416/5 |
| 905,089 | 11/1908 | McBerty | 416/5 |
| 1,445,402 | 2/1923 | Le Velle | 416/5 |
| 1,583,864 | 5/1926 | Tucker | 416/5 |
| 4,073,598 | 2/1978 | Mizutani et al. | 416/5 |
| 4,357,506 | 11/1982 | Breining | 200/52 R |
| 4,402,649 | 9/1983 | Laurel | 416/5 |
| 4,634,345 | 1/1987 | Stanek et al. | 416/244 R |

FOREIGN PATENT DOCUMENTS

| | | |
|---|---|---|
| 4810385 | 4/1987 | Australia . |
| 58-101292 | 6/1983 | Japan . |
| 385772 | 1/1933 | United Kingdom . |
| 1208928 | 10/1970 | United Kingdom . |
| 1584264 | 2/1981 | United Kingdom . |

OTHER PUBLICATIONS

Brochure entitled "A Contemporary Ceiling Fan System Designed by Sonneman for Homestead" by Homestead Products, ©1987.

*Primary Examiner*—John T. Kwon
*Attorney, Agent, or Firm*—Rothwell, Figg, Ernst & Kurz

[57] ABSTRACT

An easily assembled, aesthetically pleasing ceiling fan has a main support shaft which supports an outer decorative column and canopies as well as a drive motor having a rotor mounting a blade support housing and carrying easily attachable fan blades. A bottom cover is also supported from the shaft for ease of assembly and providing a surface configuration coordinating with the canopies and blade support housing.

9 Claims, 2 Drawing Sheets

FIG. 2
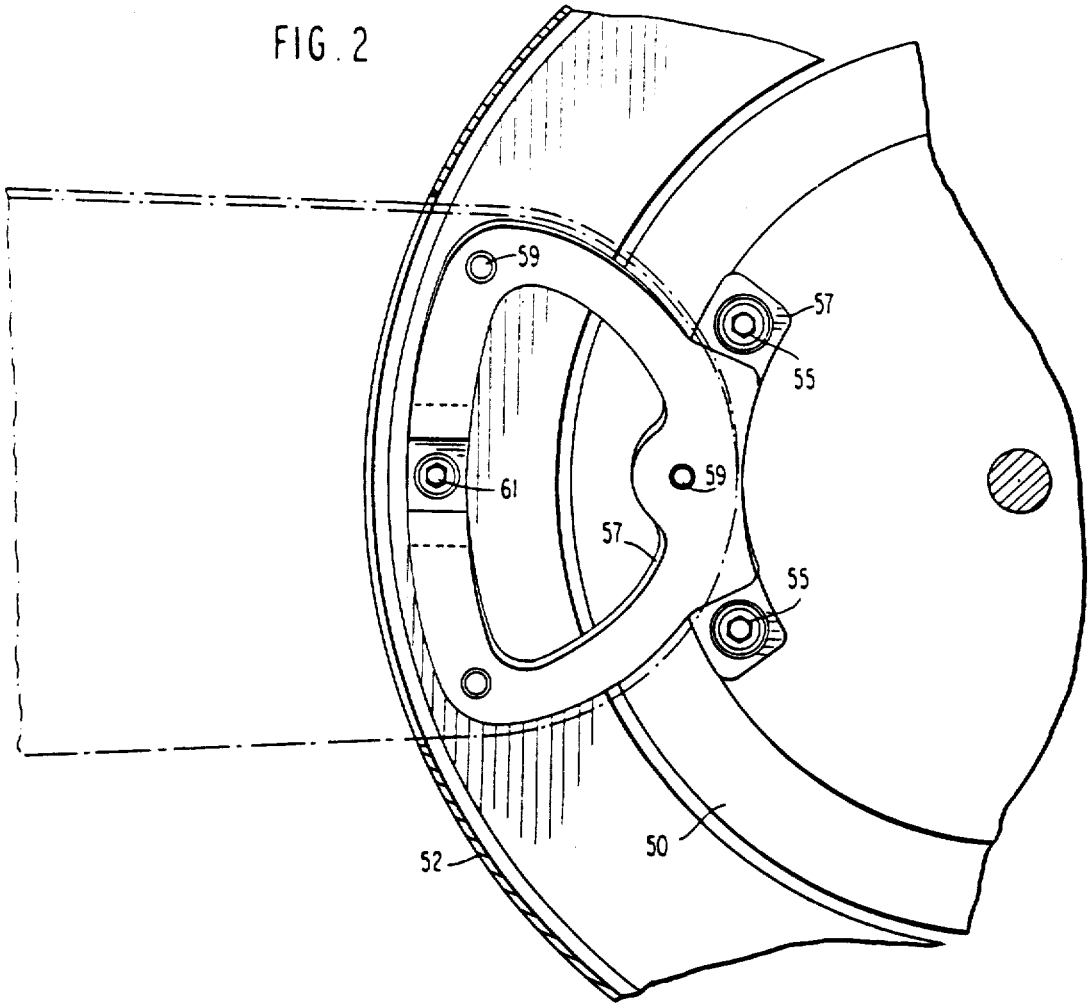
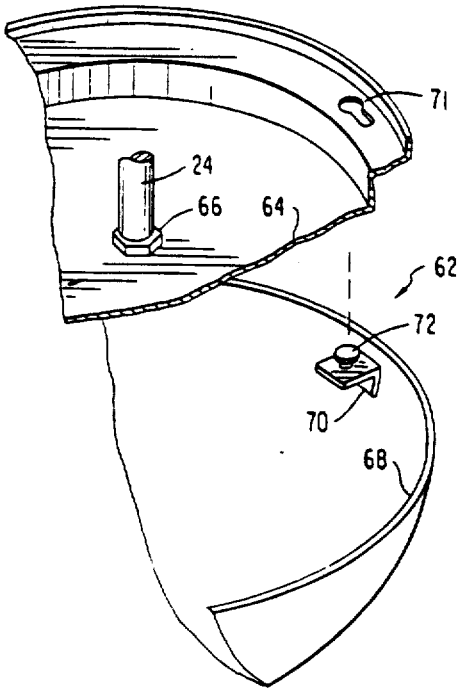
FIG. 3

CEILING FAN ASSEMBLY

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to improvements in ceiling fan assemblies.

2. Background Art

Ceiling fans are extremely useful and popular because of their ability to move and circulate air within a room. Commonly, ceiling fans also include light for lighting a room. Because ceiling fans are so centrally visible when installed, they become part of the interior decoration of the room. Ceiling fans must have certain elemental parts in order to operate. That is, they must have a means for supporting the fan from the ceiling, a motor drive and fan blades. Often these elemental parts are not aesthetically pleasing and it is difficult to devise a construction utilizing conventional motors and supports to create a ceiling fan assembly so aesthetically pleasing as to win awards to be recommended by professional interior decorators. It has proven extremely difficult to do this given the necessity of a motor with a control rotor for driving the fan blades and a hanging support for the motor.

Also, it is common practice in the art to ship the ceiling fans unassembled and the fan must, therefore, be assembled prior to and during installation. That is, the hanging rod, motor and blades usually must be assembled and this is typically not an extremely easy task. There is need in the art for a simplified assembly to create a structurally sound ceiling fan of aesthetically pleasing configuration and which makes installation easier.

SUMMARY OF THIS INVENTION

This invention provides a unique ceiling fan assembly having a dual support rod system in which a center support rod supports the components while an outer hollow column attaches to fan housing and provides a unique, decorative appearance. The drive motor, enclosed in a decorative housing, drives a blade mounting bracket to which the fan blades are removably attachable. A bottom cover is also easily attachable by a simple attachment and may incorporate or be replaced by a light unit.

BRIEF DESCRIPTION OF THE DRAWINGS

FIG. 2 is a bottom plan view partially in section showing the means of attaching and driving the fan blades.

FIG. 3 is a perspective view showing the means of attaching the fan's bottom cover.

DETAILED DESCRIPTION OF THE PREFERRED EMBODIMENTS

Figure 1:
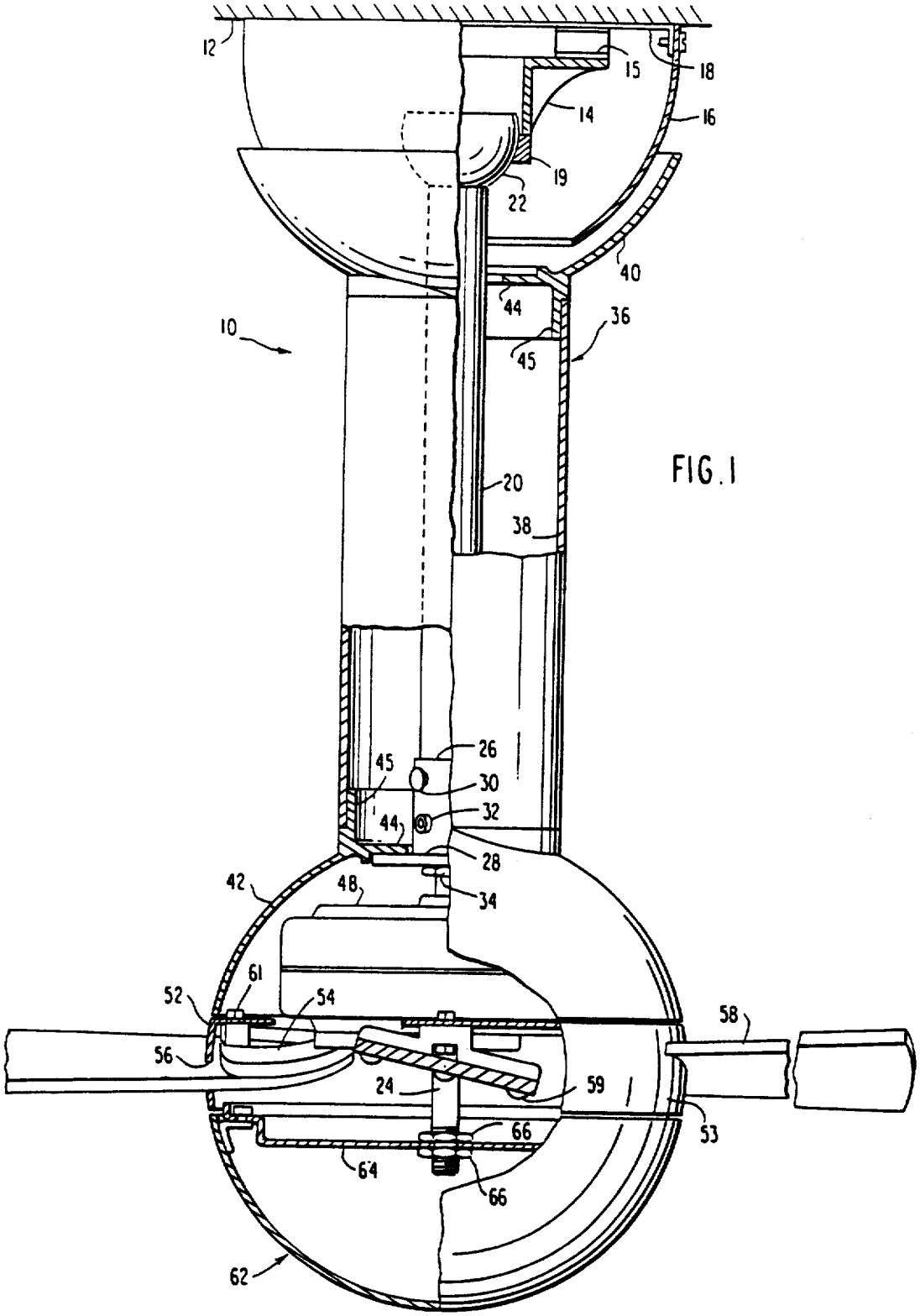
FIG. 1 is an elevation view, partially in section, showing the unique ceiling fan assembly of this invention.

A ceiling fan assembly 10 is provided for hanging from a ceiling structure 12. A ceiling fixture 14 may be directly attached to the ceiling structure 12 or, preferably, spaced from the ceiling structure by spacers 15 in order to allow additional room for wiring and the like. A ceiling canopy 16 of a desired configuration fits over the ceiling fixture and is secured to a support pad 18 which is rigidly attached to the ceiling 12. A part spherical bearing is provided for hanging a vertical shaft 20 (also sometimes referred to as a down rod). The upper end of shaft 20 has a partially spherical knob 22 for cooperating with bearing 19 and allowing the fan to hang vertically even if mounted on an inclined ceiling structure 12. The shaft 20 has a lower portion 24 of reduced diameter and is appropriately threaded at portions to allow the placement of jam nuts as will be described.

A hub 26 with a flange 28 has an internal diameter for fitting over the shaft 20 as shown in FIG. 1. For attaching the hub 26' to the shaft 20 a pin 30 is provided for extending through a hole in the hub and a hole in the shaft to be held in place by a cotter pin (not shown). For locking the hub in place on the shaft there is provided a set screw 32. For preventing vertical downward movement of the hub 26 there is provided a jam nut 34 screwed onto the lower portion 24 of shaft 20.

A column assembly 36 provides a decorative outer appearance while not interfering with the support and drive of the fan. Column assembly 36 includes a hollow column 38 which may be fluted, cylindrical, or other shape. Column 38 mates with and is attached to an upper canopy 40 and an identical lower canopy 42. Each of the canopies has an inwardly extending flange 44. The two canopies have an axially extending mating portion 45 which mates with the configuration of the column 38 so that the column and the two canopies can be assembled together. The column assembly 36 may be secured to the hub flange 28 via screws (not shown) which extend through screw holes in the flange 44.

An electrical drive motor 48 is of the type having a stator and drive rotor 50. The rotor 50 has attached to it a blade drive housing 52, having a part spherical outer surface with slots 56 therein for insertion of fan blades 58. There are a plurality of fan blades. In the embodiment shown there are four which are inserted in the slots at a preferable pitch of 12°. The blades are secured in the blade drive housing by means of attachment means including a bracket 57 which extends as shown in FIG. 2. The blades 58 are attached to bracket 57 by screws 59 as shown in FIGS. 1 and 2, and bracket 57 is attached to rotor 50 by means of bolts 55 as shown in FIG. 2. Bracket 57 is attached to the blade drive housing 52 by bolt 61 as shown in FIGS. 1 and 2.

A bottom cover assembly 62 includes a bottom pan 64 which is secured to and supported by the bottom portion 24 of shaft 20 and is held in place by jam nuts 66. A bottom cover 68 has secured to its inner peripheral surface a plurality of attachment bracket 70 each of which has a button heat 72. The pan 64 has head and slot type openings 71 for the button head 72 so that the cover can be put in place, rotated slightly and held onto pan 64, as shown in FIG. 3.

As can be seen in FIG. 1, the column assembly 36 includes partly spherically shaped canopies and the bottom cover 68 is hemispherical. The outer surface of the blade drive housing 52 is also partly spherical so that the combination of lower canopy 42, blade drive housing 52 and bottom cover 68 create the appearance of a ball, the center portion of which (the blade drive housing 52 and blades 58) rotate.

In assembly of the ceiling fan, the hub 26 and motor 48 are preassembled onto shaft 20 at the factory. However, the hub 26 must be fixed by inserting the pin 30 and the cotter pin, and the set screw 32 is turned to tighten the hub 26 in place. The column 38 is then fitted over the shaft 20 and onto the assembly which includes lower canopy 42 fixed to the hub flange 28. The top canopy 40 is then put on the top of column 38. The ceiling fixture 14 may be attached and the ceiling canopy 16 connected to the ceiling fixture. Next the fan assembly is lifted and the hemispherical portion 22 in the upper end of shaft 20 is inserted into bearing pad 19. Thereafter, the blades 58 are installed into the blade drive housing, and secured. The next step is to place the pan 64 on shaft 50 and then the bottom cover 68 on pan 64 and align the slots 71 to the button heads 72 of the attaching brackets 70 and turn the bottom cover until it is indexed. This provides a simple and easy assembly of the fan which is shipped knocked down.

In an actual embodiment of the fan to be sold commercially, the fan is provided with a three-speed/-reverse, shaded 16 pole, sealed ball bearing dual capacitor motor, solid wood blades at 12° pitch for moving 10,000 cubic feet of air per minute. The three speeds of the motor are 70, 140 and 210 RPM for low, medium and high speed. The fan will adapt to a sloped ceiling up to a maximum of 45°.

Instead of or incorporated into the bottom cover 68 may be lights including dome, incandescent lights or halogen recessed lights in the form of separate kits.

As can be seen, this invention provides a unique assembly for allowing aesthetically pleasing design of a fan and an easy assembly of the fan components.

What is claimed is:

1. A ceiling fan assembly comprising:

(a) a ceiling fixture attachable to a ceiling structure;

(b) a shaft having one end shaped to hang vertically from the ceiling fixture;

(c) a support hub attached to the other end of [the hollow] *said* shaft;

(d) a column assembly supported from the hub and including an elongated vertical hollow column surrounding and spaced from the shaft, and further including a partly spherically shaped canopy at a lower end thereof;

(e) an electric fan drive motor carried by the lower end of the shaft, the motor having a drive rotor;

(f) a fan blade support structure positioned below said canopy, the fan blade support structure including a partly spherical blade support housing having spaced fan blade mounting slot therein, the support structure including means for attaching the support structure to the motor rotor and means for attaching fan blades to said support structure;

(g) a plurality of fan blades having attachment means on the inner end of each blade for attachment to blade support structure;

(h) a partly spherical bottom cover assembly positioned below the fan blade support structure for at [lease] *least* partially covering the bottom of the motor while being spaced therefrom, the bottom cover supported from the bottom of the shaft, the combination of said canopy, said fan blade support housing and said bottom cover assembly surrounding said drive motor and providing the appearance of a ball.

2. A ceiling fan as in claim 1 wherein the column assembly further includes an upper canopy spaced from and at least partially enclosing the ceiling fixture.

3. A ceiling fan as in claim 1 wherein the support hub is a flanged hub, the flange of which mounts the column assembly.

4. A ceiling fan as in claim 3 further including means for detachably attaching the support hub to the shaft for ease in assembly.

5. A ceiling fan as in claim 2 wherein the upper canopy is partly spherically shaped.

6. A ceiling fan as in claim 1 wherein the upper end of the vertically hanging shaft is part spherically shaped.

7. A ceiling fan as in claim 1 wherein the bottom cover assembly includes a pan attached to the lower end of the shaft and wherein the bottom cover is removably attached to the pan.

8. *A ceiling fan assembly comprising:*

*a ceiling fixture attachable to a ceiling structure;*

*a shaft having one end shaped to hang vertically from the ceiling fixture;*

*a support hub attached to the other end of said shaft;*

*a partly spherically shaped canopy supported by said support hub;*

*an electric fan drive motor carried by the lower end of the shaft, the motor having a drive rotor;*

*a partly spherical fan blade support structure having spaced fan blade mounting slots therein the securely retaining fan blades, and means for attaching said support structure to said drive rotor;*

*a plurality of fan blades each having attachment means on an inner end thereof for attachment to said blade support structure; and*

*a partly spherical bottom cover assembly positioned below said fan blade support structure for at least partially covering the bottom of the motor while being spaced therefrom, the bottom cover supported from the bottom of the shaft;*

*the combination of said canopy, said fan blade support structure and said bottom cover assembly surrounding said drive motor and providing the appearance of a ball.*

9. *A ceiling fan assembly comprising:*

*a ceiling fixture attachable to a ceiling structure;*

*a shaft having one end shaped to hang vertically from the ceiling fixture;*

*a support hub attached to the other end of said shaft;*

*a canopy supported by said support hub, the canopy having its outside surface shaped in the form of a first portion of a unitary geometrical shape;*

*an electric fan drive motor carried by the lower end of the shaft and positioned within said canopy, the motor having a drive rotor;*

*a fan blade support structure having its outside surface shaped in the form of a second portion of said unitary geometrical shape, including spaced fan blade mounting slots therein, and means for attaching said support structure to said drive rotor;*

*a plurality of fan blades each having attachment means on an inner end thereof for attachment to said blade support structure; and*

*a bottom cover assembly having its outside surface shaped in the form of a third portion of said unitary geometrical shape, positioned below said fan blade support structure and at least partially covering the bottom of the motor while being spaced therefrom, the bottom cover supported from the bottom of the shaft;*

*the combination of the outside surfaces of said canopy, said fan blade support structure and said bottom cover assembly combining to produce a smooth unitary uninterrupted surface so that fan blade support structure appears on the surface as a continuum of the adjacent surfaces of the canopy and bottom cover assembly.*

* * * * *

UNITED STATES PATENT AND TRADEMARK OFFICE

CERTIFICATE OF CORRECTION

PATENT NO. : Re. 34,147

DATED : December 22, 1992

INVENTOR(S) : Ron REZEK

It is certified that error appears in the above-indentified patent and that said Letters Patent is hereby corrected as shown below:

Col. 2, line 57, "heat" should be --head--.

Col. 3, line 50, "slot" should be --slots--.

Signed and Sealed this

Twenty-seventh Day of September, 1994

*Attest:*

Bruce Lehman

BRUCE LEHMAN

*Attesting Officer*

*Commissioner of Patents and Trademarks*